United States Patent
Liau et al.

(10) Patent No.: US 11,167,676 B2
(45) Date of Patent: Nov. 9, 2021

(54) LOAD-BEARING FABRIC ARCHITECTURE

(71) Applicant: Tesla, Inc., Palo Alto, CA (US)

(72) Inventors: Forrest Wen Liau, Palo Alto, CA (US); Stefan Kuzmanovski, Richmond, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 16/206,891

(22) Filed: Nov. 30, 2018

(65) Prior Publication Data
US 2019/0168648 A1 Jun. 6, 2019

Related U.S. Application Data

(60) Provisional application No. 62/595,239, filed on Dec. 6, 2017.

(51) Int. Cl.
*B60N 2/70* (2006.01)
*A47C 7/18* (2006.01)
*D04B 39/00* (2006.01)
*D03D 1/00* (2006.01)

(52) U.S. Cl.
CPC ............ *B60N 2/7011* (2013.01); *A47C 7/185* (2013.01); *D03D 1/00* (2013.01); *D04B 39/00* (2013.01)

(58) Field of Classification Search
CPC ...... B60N 2/7011; B60N 2/70; B60N 2/7005; A47C 7/185; A47C 7/20; A47C 7/282; D03D 1/00; D04B 39/00
USPC ........................... 297/452.56, 452.55, 452.59
See application file for complete search history.

(56) References Cited

U.S. PATENT DOCUMENTS

| | | | | |
|---|---|---|---|---|
| 2005/0099052 A1* | 5/2005 | Bertolini | ............. | A47C 3/04 297/440.1 |
| 2007/0200574 A1* | 8/2007 | Sato | ............. | A63H 29/22 324/754.07 |
| 2010/0259089 A1* | 10/2010 | Mizobata | ............. | B60N 2/7011 297/452.56 |
| 2012/0228918 A1* | 9/2012 | Takahashi | ............. | B60H 3/00 297/452.55 |
| 2012/0326484 A1* | 12/2012 | Kawano | ............. | B60N 2/68 297/452.55 |
| 2013/0193738 A1* | 8/2013 | Siekman | ............. | A47C 7/021 297/452.56 |
| 2014/0070595 A1* | 3/2014 | Taniguchi | ............. | B29C 44/1214 297/452.59 |
| 2014/0259429 A1* | 9/2014 | Clayton | ............. | A47C 27/144 5/691 |
| 2015/0283923 A1* | 10/2015 | Kordel | ............. | B60N 2/7094 297/452.49 |
| 2016/0107752 A1* | 4/2016 | Palmer | ............. | A47C 7/18 267/143 |
| 2016/0114711 A1* | 4/2016 | Takahashi | ............. | B60N 2/68 297/452.59 |
| 2019/0143863 A1* | 5/2019 | O'Hara | ............. | B64D 11/0647 297/452.48 |

* cited by examiner

Primary Examiner — Mark R Wendell
(74) Attorney, Agent, or Firm — Knobbe, Martens, Olson & Bear LLP

(57) ABSTRACT

A load-bearing fabric architecture including a soft surface material, a support system provided in contact with the soft surface material. The support system comprises a frame and structural surface material connected to the frame. The soft surface material is at least partially disposed above the support system, and the support system is configured to support an applied load.

22 Claims, 10 Drawing Sheets

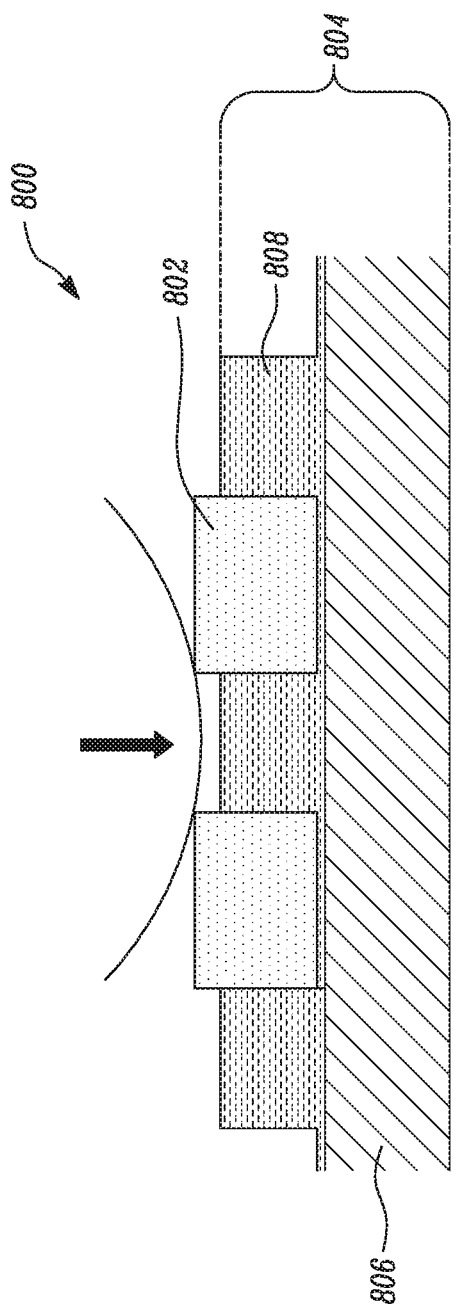
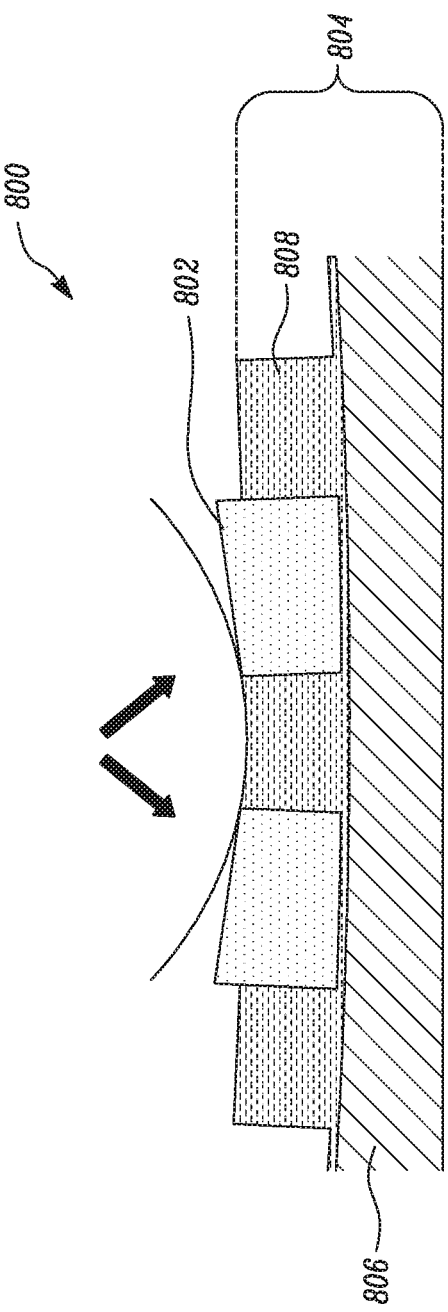
FIG. 8
FIG. 9

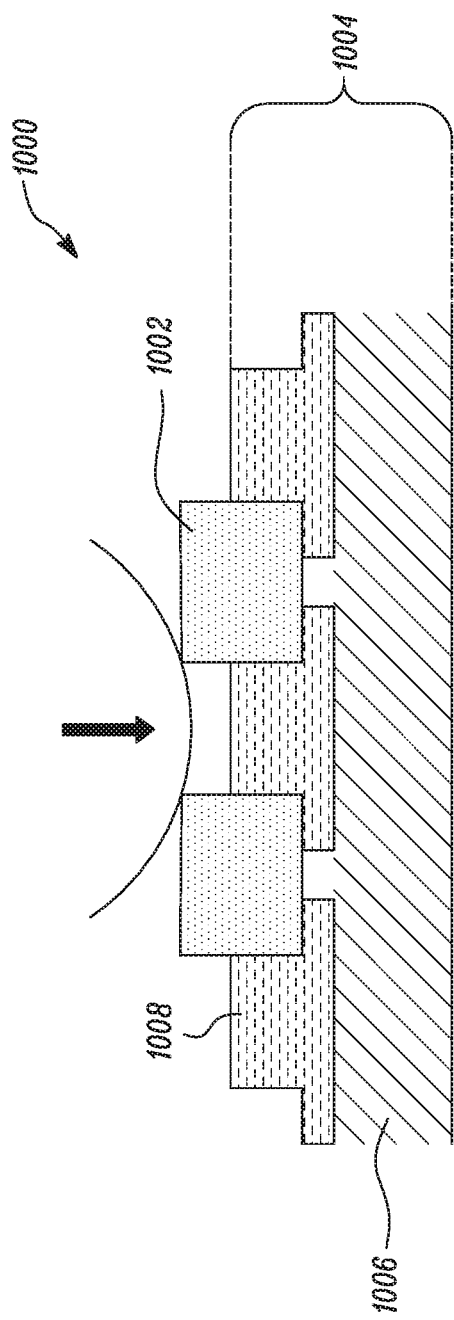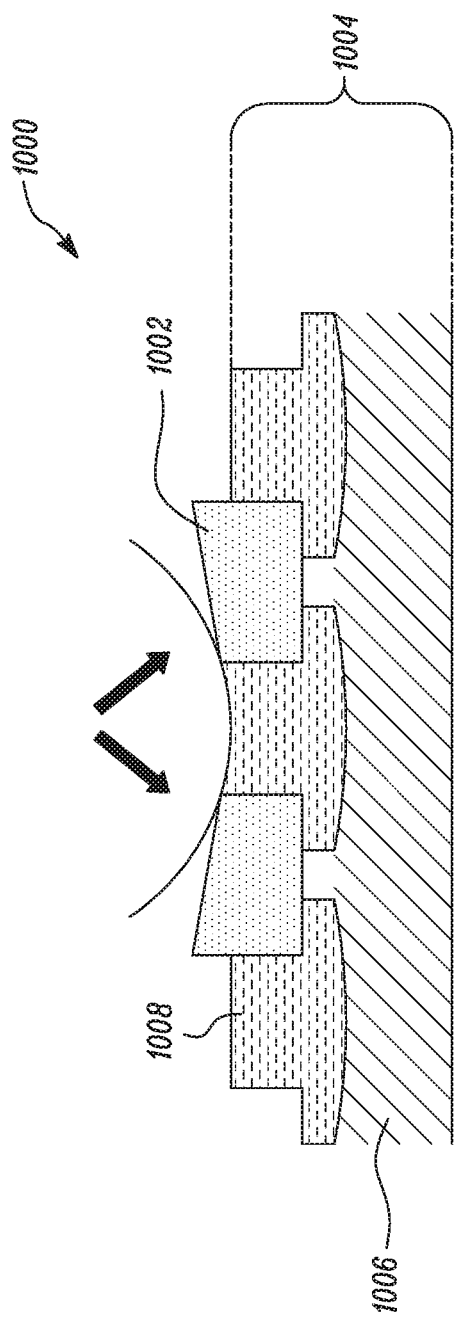

LOAD-BEARING FABRIC ARCHITECTURE

CROSS-REFERENCE TO RELATED APPLICATION

The present U.S. Utility patent application claims priority pursuant to 35 U.S.C. § 119(e) to U.S. Provisional Application No. 62/595,239, entitled "Load-Bearing Fabric Architecture", filed Dec. 6, 2017, which is hereby incorporated herein by reference in its entirety and made part of the present U.S. Utility patent application for all purposes.

TECHNICAL FIELD

The present disclosure relates to a fabric architecture. More particularly, the present disclosure relates to a fabric architecture for different load-bearing applications.

BACKGROUND

Fabric is used for seating in automotive and other applications. Materials such as animal leather and synthetic leather (e.g., non-recyclable polyurethane synthesized using toxic isocyanates) may be used for such applications. However, leather may not be sustainable and has limited applicability in certain environments, for example, environments needing electrical functionality. In such cases, textiles may be preferred due to their feel and adaptability, for example, ability to handle higher heat generated during operation. Further, textiles may have additional features for automotive applications requiring occupancy sensing or heating by incorporating wires and fiber devices, and allowing moist vapor transport for breathability.

Current premium textiles that are used in automotive and other environments are made of fine wools (e.g., merino and cashmere) that have an excellent soft hand feel. However, these textiles are not durable enough to withstand abrasive loads caused by repeated passenger ingress and egress. Since the wool in such textiles is delicate, the textile can only be used in smaller areas that do not undergo repeated stress. Alternatively, durable textiles may be used in place of these premium textiles in other areas of the textile that are subject to high wear. However, these durable textiles typically do not look or feel as luxurious as natural fabrics, such as fine wool. One solution may include blending the fine wool with more durable yarns or fibers, but such resulting fabrics tend to be neither very durable nor very soft to the touch.

Hence, there is a need for an improved fabric that overcomes the aforementioned drawbacks.

SUMMARY

The fabric architecture according to the present disclosure introduces a load-bearing fabric that has a soft hand feel and can withstand varying loads applied thereon. The load-bearing fabric architecture includes a soft surface material and a support system. In an embodiment, the support system includes a frame and structural surface material that are connected to the soft surface material such that the soft surface material at least partially extends above the support system. The structural surface material are also connected to the frame. The support system provides support for loads that are applied on the soft surface material, such that on application of the load, the soft surface material moves downwards causing the structural surface material to contact with the load. The load-bearing fabric architecture has a soft hand feel due to the soft surface material that is made of wool. Further, the structural surface material, such as yarn, allows the fabric to withstand varying loads. Such load-bearing fabrics may be used in suspension textiles.

In an embodiment, the structural surface material are at least partially in contact with a supporting material, for example, foam, that lies beneath the structural surface material. The large cross section of the structural surface material provides an upward force when in contact with the supporting material, allowing varying loads to be applied on the load-bearing fabric. Such load-bearing fabrics may be used for seat cushion covers.

The load-bearing fabric architecture exposes the soft surface material upon contact with loads that are generally light, providing a soft hand feel. Further, the soft surface material sinks below the support system when higher loads are applied, causing the structural surface material to contact the load. Due to material properties of the structural surface material, the structural surface material are capable of withstanding compression and abrasion.

BRIEF DESCRIPTION OF THE FIGURES

FIGS. 8 and 9 illustrate cross-sectional views of yet another embodiment of the load bearing fabric architecture for varying load applications according to certain embodiments of the invention.

FIGS. 10 and 11 illustrate cross-sectional views of yet another embodiment of the load bearing fabric architecture for varying load applications according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

Figure 1:
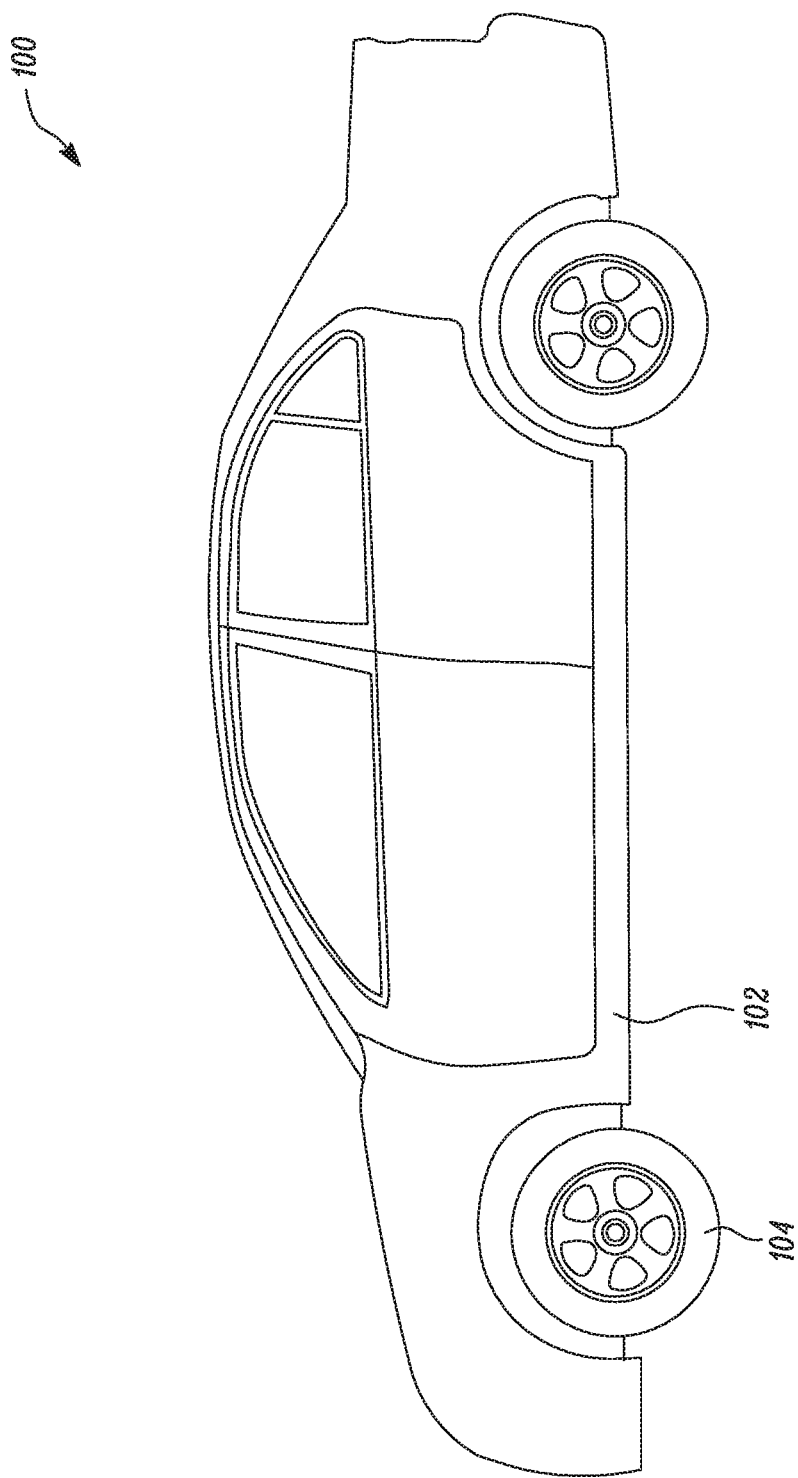
FIG. 1 illustrates a side profile of an exemplary vehicle according to certain embodiments of the invention.

FIG. 1 illustrates a side profile of an exemplary vehicle 100 such as, for example, a passenger car, truck, sport utility vehicle, or van. The vehicle 100 includes a frame 102 that is supported by a set of wheels 104. The vehicle 100 includes a power source (not shown) configured to propel the vehicle 100.

Load-bearing fabric architectures are used at different locations within the vehicle 100, for example, suspension textiles, seat cushion covers, and so on. The present disclosure relates to various embodiments of the load-bearing fabric architecture that may be utilized for the suspension textile and the cushion covers respectively and will be explained in connection with FIGS. 2 to 19. It should be noted that the description provided in this section is equally applicable to any type of seating application for example, furniture and airplane seats, and is not limited to that described herein.

Figure 2:
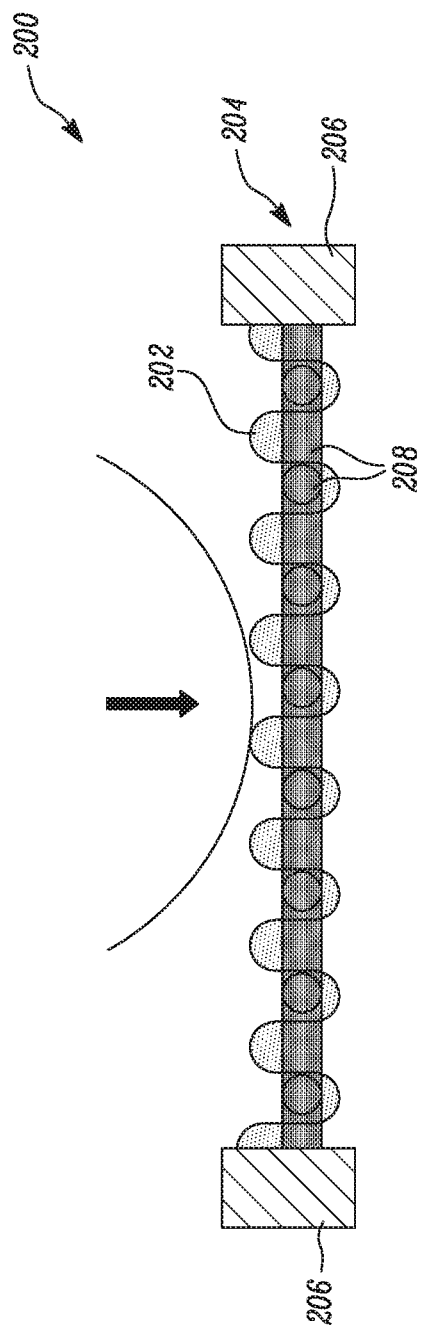
FIGS. 2 and 3 illustrate cross-sectional views of one embodiment of a load bearing fabric architecture for varying load applications according to certain embodiments of the invention.
Figure 3:
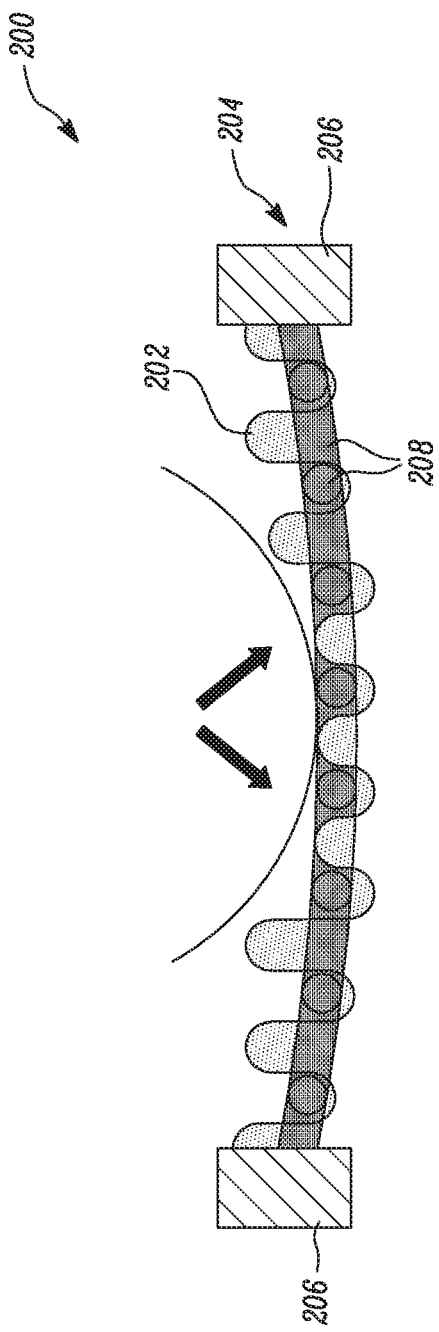

FIGS. 2 and 3 illustrate cross-sectional views of the load-bearing fabric architecture 200 when different loads are applied thereon. Referring to FIGS. 2 and 3, the load-bearing fabric architecture 200 includes a soft surface material 202 and a support system 204. The support system 204 includes a frame 206 and structural surface material 208 connected thereto. The frame 206 is provided at two ends of the load-bearing fabric architecture 200. The soft surface material 202 is provided on the structural surface material 208 in such a manner that when no load is applied on the load-bearing fabric architecture 200, the soft surface material 202 is disposed partially above the structural surface material 208 of the support system 204. More particularly, the soft surface material 202 is provided in such a manner that the soft surface material 202 extends above and goes through a mesh type large cross-section of the structural surface material 208 and is flush or proud of the structural surface material 208.

When no load is applied on the load-bearing fabric architecture 200, the soft surface material 202 that extends above a top surface of the structural surface material 208 presents itself for contact. The soft surface material 202 may include wool (e.g., cashmere or merino) or any other soft elastomer and has a soft hand feel. The structural surface material 208 provide strength and structural stability to the load-bearing fabric architecture 200. The structural surface material 208 may include yarn, foam, lattice structure, or any other suitable solid material. The frame 206 may be made of any suitable material such a wood, metal, plastic, and so on. The structural surface material 208 increase a load bearing capacity of the load-bearing fabric architecture 200.

When relatively light loads are applied on the load-bearing fabric architecture 200, as shown in FIG. 2, the light load comes in contact with the soft surface material 202 that lends the soft feel. The light load applies a downward force on the load-bearing fabric architecture 200 and causes some portion of the soft surface material 202 to get pushed inwards and into the mesh type structure of the structural surface material 208. The mesh type cross-section of the structural surface material 208 allows the soft surface material 202 to sink into and in some cases, may extend beyond a bottom surface of the structural surface material 208. The frame 206 and the structural surface material 208 that are connected to the frame 206 provide an upward force for sustaining the light load that is applied on the load-bearing fabric architecture 200.

When heavier loads are applied on the load-bearing fabric architecture 200, as shown in FIG. 3, the heavy load applies the downward force on the load-bearing fabric architecture 200. The heavy load in turn causes the soft surface material 202 to sink into and get pushed behind the structural surface material 208. Further, the heavy load contacts the structural surface material 208, causing the support system 204 to hold a majority of the load and transfer forces to the frame 206. The combination of the structural surface material 208 and the frame 206 provide support to the soft surface material 202, allowing the load-bearing fabric architecture 200 to withstand heavy load.

Figure 4:
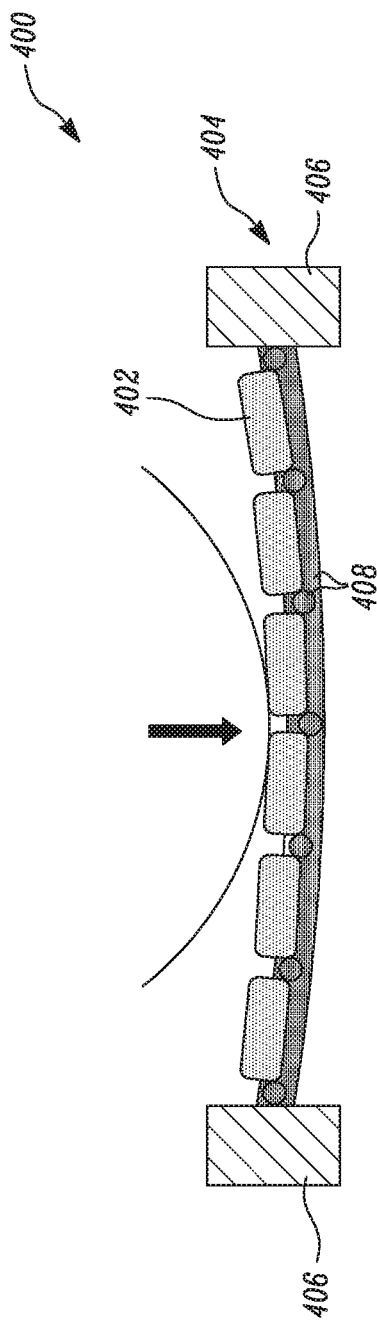
FIGS. 4 and 5 illustrate cross-sectional views of another embodiment of the load bearing fabric architecture for varying load applications according to certain embodiments of the invention.
Figure 5:
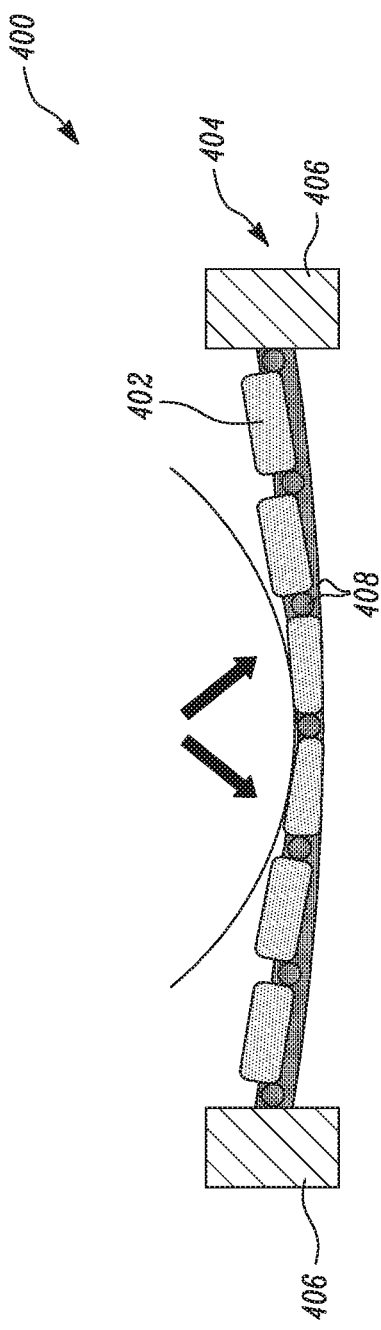

FIGS. 4 and 5 illustrate an embodiment of the load-bearing fabric architecture 400 in which the soft surface material 402 is attached to the structural surface material 408 of the support system 404 in such a manner that isolated or partially-interconnected islands of the soft surface material 402 extend above the top surface of the structural surface material 408 when light or no load is applied. As shown in FIG. 4, when light loads are applied on the load-bearing fabric architecture 400, the light load comes in contact with the soft surface material 402. When heavy loads are applied on the load-bearing fabric architecture 400, as shown in FIG. 5, the soft surface material 402 sinks into the structural surface material 408 of the support system 404 and the structural surface material 408 contact the heavy load. Further, the frame 406 and the structural surface material 408 provide support for the heavy load. The load-bearing fabric architectures described in connection with FIGS. 2 to 5 can be used in the suspension textiles of the vehicle 100. These load-bearing fabric architectures can be made using computerized weaving or three-dimensional knitting techniques.

Figure 6:
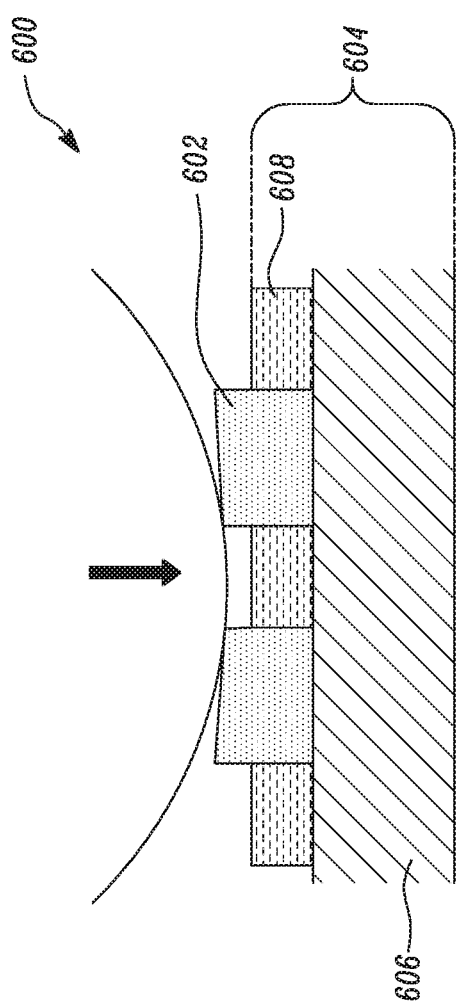
FIGS. 6 and 7 illustrate cross-sectional views of yet another embodiment of the load bearing fabric architecture for varying load applications according to certain embodiments of the invention.
Figure 7:
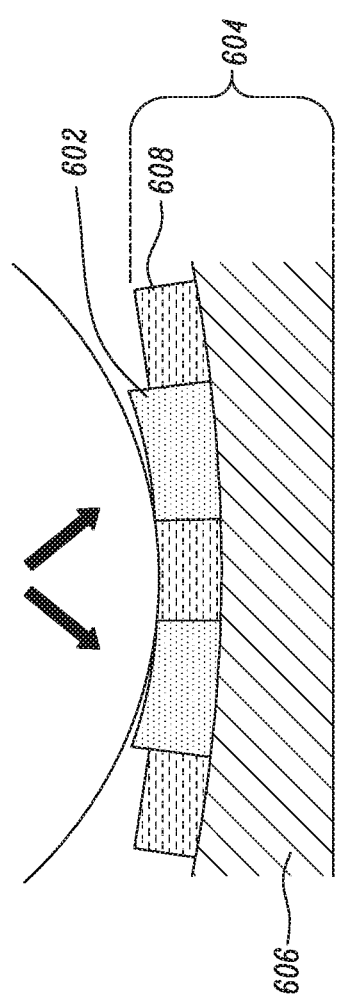

FIGS. 6 and 7 illustrate cross sectional views of another load-bearing fabric architecture 600. The load-bearing fabric architecture 600 includes the soft surface material 602. The soft surface material 602 is in contact with the support system 604. The support system 604 includes a supporting material 606 and the structural surface material 608 connected to and lie above the supporting material 606. The supporting material 606 lies beneath the structural surface material 608 and extends substantially parallel to the load-bearing fabric architecture 600.

The isolated islands of the soft surface material 602 are provided on top of a bed of the structural surface material and adjacent to respective isolated islands of the structural surface material 608 in such a manner that when no load is applied on the load-bearing fabric architecture 600, the soft surface material 602 lies at least partially above the structural surface material 608 of the support system 604. More particularly, the soft surface material 602 is provided in such a manner that the soft surface material 602 is disposed above the structural surface material 608 and may be either flush or proud of the structural surface material 608.

When no load is applied on the load-bearing architecture 600, the soft surface material 602 presents itself for contact. The soft surface material 602 may include wool (e.g., cashmere or merino) and has a soft hand feel. The structural surface material 608 provide strength and structural stability to the load-bearing fabric architecture 600. The structural surface material 608 may include yarn, foam, lattice structure, or any other suitable solid material. The supporting material 606 may include foam or any suitable material for forming the cushion. The structural surface material 608 increase a capacity of the load-bearing fabric architecture 600 to withstand loads while reducing wear on the soft surface material 602.

When relatively light loads are applied on the load-bearing fabric architecture 600, as shown in FIG. 6, the light load comes in contact with the soft surface material 602 that lends the soft feel. The light load applies the downward force on the load-bearing fabric architecture 600 and causes the soft surface material 602 to get pushed downwards and towards the supporting material 606. The structural surface material 608 and/or the supporting material 606 provide the upward force for sustaining the light load.

When heavier loads are applied on the load-bearing fabric architecture 600, as shown in FIG. 7, the heavy load applies the downward force on the load-bearing fabric architecture 600. The heavy load in turn causes the soft surface material 602 to sinks into the structural surface material 608 and the supporting material 606. Further, the heavy load contacts the structural surface material 608, causing the support system 604 to hold a majority of the load, transferring forces to the supporting material 606 that lies beneath the structural surface material 608. The combination of the structural surface material 608 and the supporting material 606 provide support to the soft surface material 602, allowing the load-bearing fabric architecture 600 to withstand the heavy load. FIGS. 8 to 19 illustrate various embodiments of the load-bearing fabric architecture that can be used for the cushion covers of the vehicle 100.

FIGS. 8 and 9 illustrate an embodiment of the load-bearing fabric architecture 800 in which the soft surface material 802 is attached to the structural surface material 808 of the support system 804 in such a manner that the isolated or partially-interconnected islands of the soft surface material 802 are disposed flush or proud of and adjacent isolated or partially-interconnected islands of the structural surface material 808 when light or no load is applied. It should be noted that the islands may appear isolated in a given cross-section, but these islands may in fact be connected for example, below the structural surface material 808 or elsewhere out-of-plane from the illustrated cross-section. Further, a rigid backing is present under the islands of the soft surface material 802 to spread the load more evenly underneath the backing. As shown in FIG. 8, when light loads are applied on the load-bearing fabric architecture 800, the light load comes in contact with the soft surface material 802. When heavy loads are applied on the load-bearing fabric architecture 800, as shown in FIG. 9, the soft surface material 802 sinks into the supporting material 806 of the support system 804 and the structural surface material 808 contact the heavy load. Further, the supporting material 806 and the structural surface material 808 provide the upwards force for supporting the heavy load.

FIGS. 10 and 11 illustrate an embodiment of the load-bearing fabric architecture 1000 in which the soft surface material 1002 is attached to the structural surface material 1008 of the support system 1004 in such a manner that isolated islands of the soft surface material 1002 are disposed flush or proud of and adjacent islands of the structural surface material 1008. As shown in FIG. 10, when light loads are applied on the load-bearing fabric architecture 1000, the light load comes in contact with the soft surface material 1002. When heavy loads are applied on the load-bearing fabric architecture 1000, as shown in FIG. 11, the soft surface material 1002 sinks into the structural surface material 1008 of the support system 1004 and the structural surface material 1008 contact the heavy load. Further, the supporting material 1006 and the structural surface material 1008 provide the upwards force for supporting the heavy load.

Figure 12:
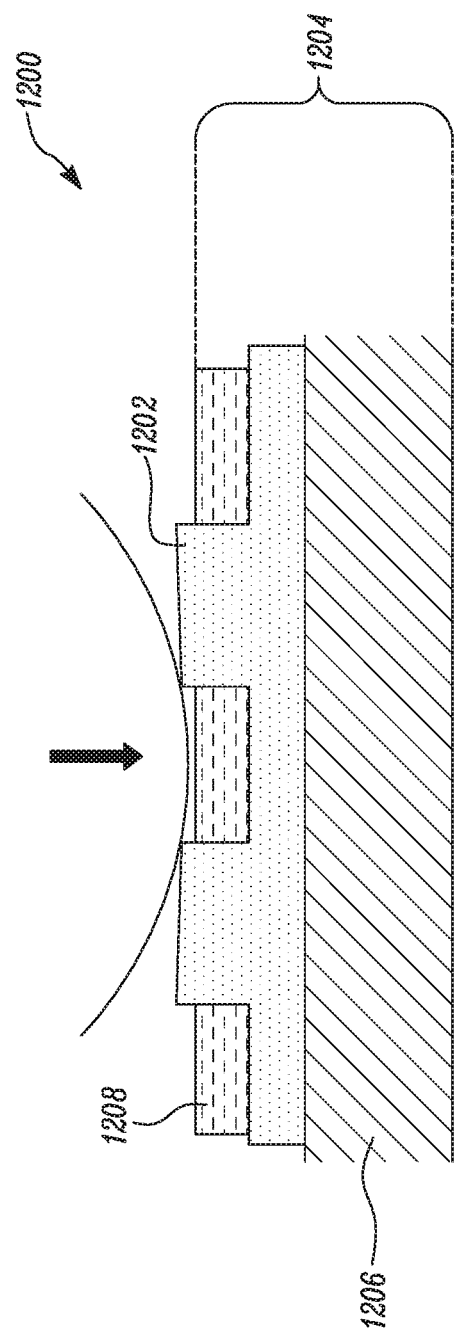
FIGS. 12 and 13 illustrate cross-sectional views of yet another embodiment of the load bearing fabric architecture for varying load applications according to certain embodiments of the invention.
Figure 13:
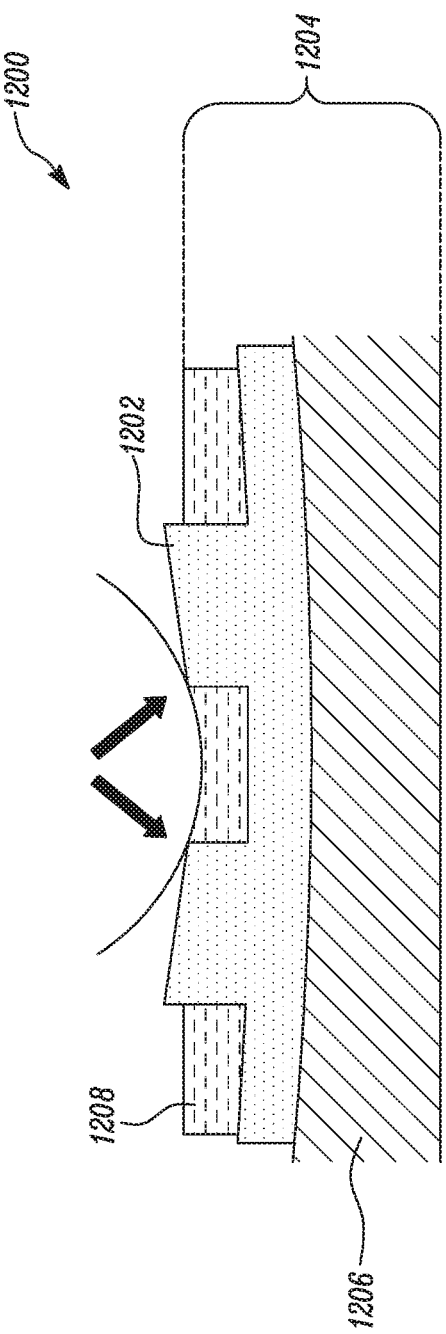

FIGS. 12 and 13 illustrate an embodiment of the load-bearing fabric architecture 1200 in which the isolated islands of the soft surface material 1202 are attached to the structural surface material 1208 of the support system 1204 in such a manner that the soft surface material 1202 is disposed flush or proud of and adjacent to the structural surface material 1208. As shown in FIG. 12, when light loads are applied on the load-bearing fabric architecture 1200, the light load comes in contact with the soft surface material 1202. When heavy loads are applied on the load-bearing fabric architecture 1200, as shown in FIG. 13, the soft surface material 1202 sinks below the structural surface material 1208 that are adjacent to the soft surface material 1202, causing the structural surface material 1208 to contact the heavy load. Further, the supporting material 1206 and the structural surface material 1208 provide the upwards force for supporting the heavy load.

Figure 14:
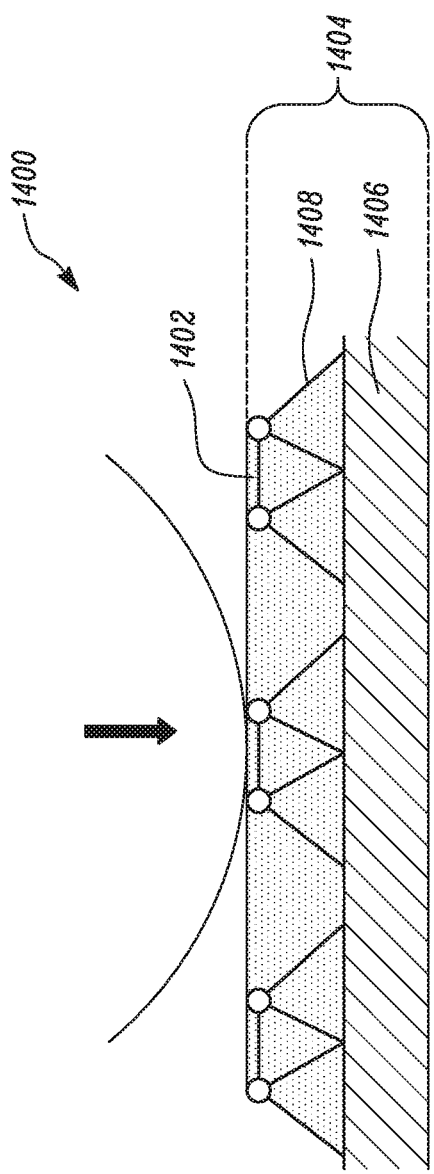
FIGS. 14 and 15 illustrate cross-sectional views of yet another embodiment of the load bearing fabric architecture for varying load applications according to certain embodiments of the invention.
Figure 15:
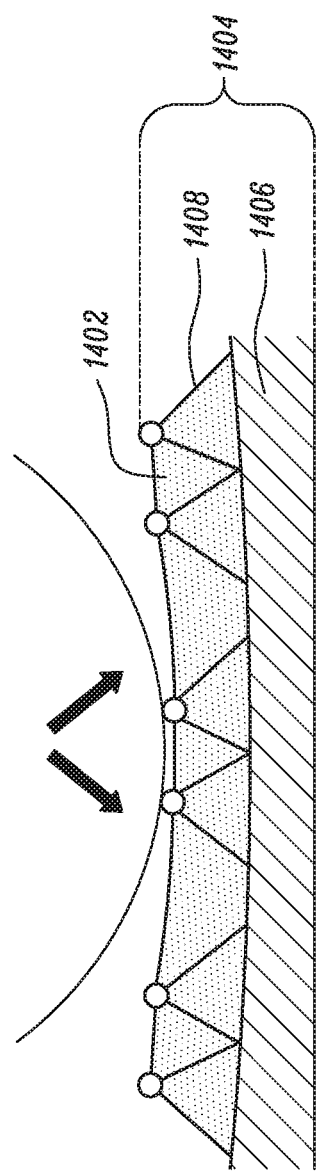

FIGS. 14 and 15 illustrate an embodiment of the load-bearing fabric architecture 1400 in which the soft surface material 1402 is attached to the mesh type islands of the structural surface material 1408 of the support system 1404 in such a manner that the soft surface material 1402 extends above, below, and in between the mesh of the structural surface material 1408. As shown in FIG. 14, when light loads are applied on the load-bearing fabric architecture 1400, the light load comes in contact with the soft surface material 1402. When heavy loads are applied on the load-bearing fabric architecture, as shown in FIG. 15, the soft surface material 1402 sinks into the mesh of the structural surface material 1408, causing the structural surface material 1408 to contact the heavy load. Further, the supporting material 1406 and the structural surface material 1408 provide the upwards force for supporting the heavy load.

Figure 16:
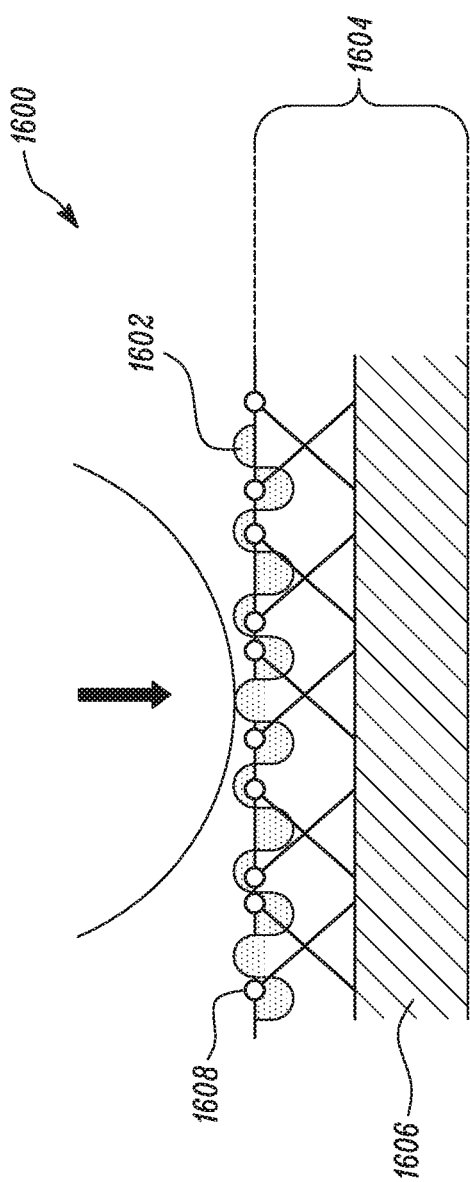
FIGS. 16 and 17 illustrate cross-sectional views of yet another embodiment of the load bearing fabric architecture for varying load applications according to certain embodiments of the invention.
Figure 17:
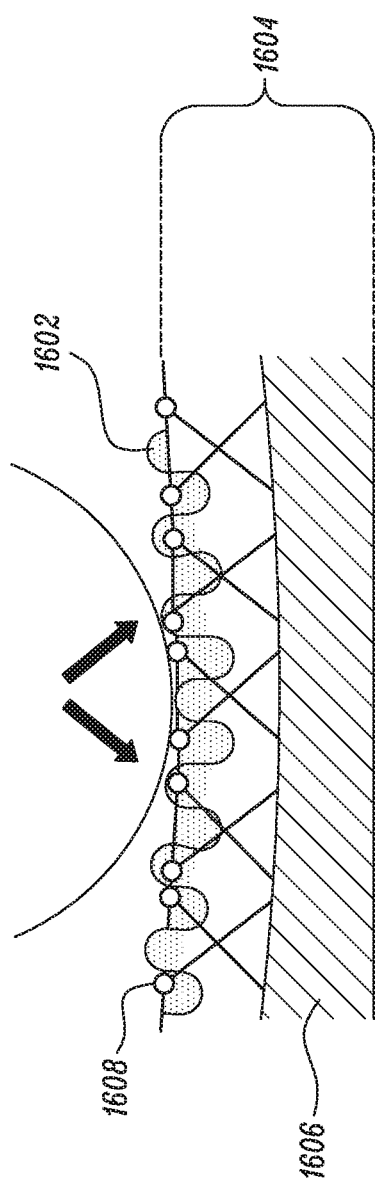

FIGS. 16 and 17 illustrate an embodiment of the load-bearing fabric architecture 1600 in which the soft surface material 1602 is attached to the structural surface material 1608 of the support system 1604 in such a manner that the soft surface material 1602 is disposed above and below the mesh of the structural surface material 1608. As shown in FIG. 16, when light loads are applied on the load-bearing fabric architecture 1600, the light load comes in contact with the soft surface material 1602. When heavy loads are applied on the load-bearing fabric architecture 1600, as shown in FIG. 17, the soft surface material 1602 sinks into the structural surface material 1608, causing the structural surface material 1608 to contact the heavy load. Further, the supporting material 1606 and the structural surface material 1608 provide the upwards force for supporting the heavy load.

Figure 18:
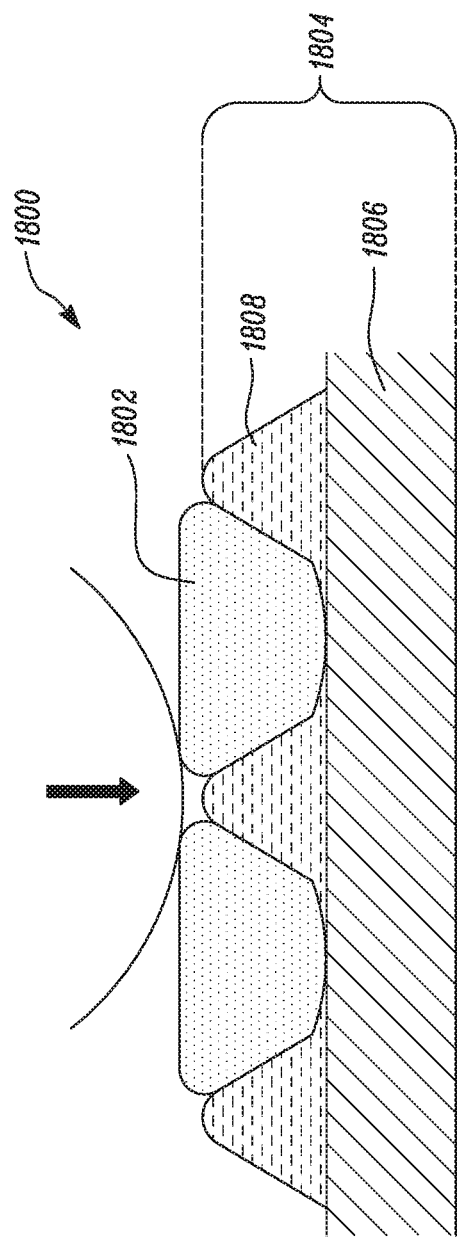
FIGS. 18 and 19 illustrate cross-sectional views of yet another embodiment of the load bearing fabric architecture for varying load applications according to certain embodiments of the invention.
Figure 19:
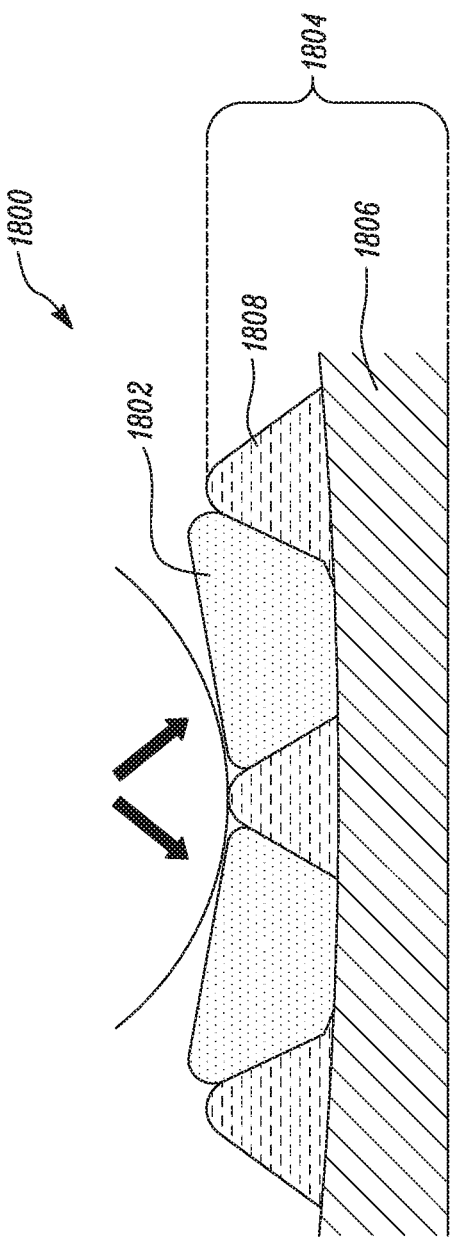

FIGS. 18 and 19 illustrate an embodiment of the load-bearing fabric architecture 1800 in which the isolated islands of the soft surface material 1802 are attached to the structural surface material 1808 and extend above the structural surface material 1808. As shown in FIG. 18, when light loads are applied on the load-bearing fabric architecture 1800, the light load comes in contact with the soft surface material 1802. When heavy loads are applied on the load-bearing fabric architecture 1800, as shown in FIG. 19, the soft surface material 1802 sinks into the structural surface material 1808 and the supporting material 1806, causing the structural surface material 1808 to contact the heavy load. Further, the supporting material 1806 and the structural surface material 1808 provide the upwards force for supporting the heavy load.

The load-bearing fabric architectures described in connection with FIGS. 6 to 19 can be used in the cushion covers of the vehicle 100. The structural and fine portions of the load-bearing fabric architecture may be separate constructions stacked, pieced together, over molded, back-injected, or fabricated together by computerized weaving, three-dimensional knitting, or other known methods. An optional rigid bottom substrate or collection of individual small substrate pixels may be provided in association with the supporting material, allowing the forces to be spread over an entire surface of the cushion cover including under the soft surface material.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A load-bearing fabric architecture comprising:
a surface material; and
a support system connected to the surface material, the support system comprising a frame and structural surface material connected to the frame,
wherein the surface material is at least partially disposed above the support system, wherein the surface material extends into and through the structural surface material, and wherein the support system is configured to support an applied load.

2. The load-bearing fabric architecture of claim 1, wherein the surface material is at least partially disposed behind the support system and is any one of flush or proud of the support system.

3. The load-bearing fabric architecture of claim 1, wherein the surface material extends above a top surface of the support system.

4. The load-bearing fabric architecture of claim 1, wherein the surface material extends below a bottom surface of the support system.

5. The load-bearing fabric architecture of claim 1, wherein the surface material is wool or a soft elastomer.

6. The load-bearing fabric architecture of claim 1, wherein the structural surface material of the support system is any one of yarn, foam, lattice structure, solid material, or any combination thereof.

7. The load-bearing fabric architecture of claim 1, wherein the structural surface material of the support system has a mesh type structure.

8. The load-bearing fabric architecture of claim 1, wherein the load-bearing fabric architecture is made using any one of computerized weaving or three-dimensional knitting.

9. The load-bearing fabric architecture of claim 1, wherein the load-bearing fabric architecture is used in suspension textiles.

10. A load-bearing fabric architecture comprising:
a surface material; and
a support system connected to the surface material, the support system comprising structural surface material at least partially in contact with a frame,
wherein the soft surface material is at least partially disposed above the support system, wherein the surface material at least partially extends into and fully through the structural surface material, and wherein the support system is configured to support an applied load.

11. The load-bearing fabric architecture of claim 10, wherein the surface material is present adjacent to the support system and is any one of flush or proud of the support system.

12. The load-bearing fabric architecture of claim 10, wherein the surface material extends above a top surface of the support system.

13. The load-bearing fabric architecture of claim 10, wherein the surface material extends below a bottom surface of the support system.

14. The load-bearing fabric architecture of claim 10, wherein the surface material is wool or a soft elastomer.

15. The load-bearing fabric architecture of claim 10, wherein the structural surface material of the support system is any one of are yarn, foam, lattice structure, solid material, or any combination thereof.

16. The load-bearing fabric architecture of claim 10, wherein the structural surface material of the support system has a mesh type structure.

17. The load-bearing fabric architecture of claim 10, wherein the supporting material is foam.

18. The load-bearing fabric architecture of claim 10, wherein the load-bearing fabric architecture is made using any one of computerized weaving or three-dimensional knitting.

19. The load-bearing fabric architecture of claim 10, wherein the load-bearing fabric architecture is used in cushion covers.

20. The load-bearing fabric architecture of claim 1, wherein the surface material sinks into the structural surface material in response to the applied load being applied to the load-bearing fabric architecture.

21. The load-bearing fabric architecture of claim 1, wherein the surface material forms a plurality of islands with the structural surface material.

22. The load-bearing fabric architecture of claim 21, wherein the plurality of islands of the surface material are isolated.

\* \* \* \* \*